United States Patent [19]

Crespo

[11] Patent Number: 5,020,078
[45] Date of Patent: May 28, 1991

[54] BAUDRATE TIMING RECOVERY TECHNIQUE

[75] Inventor: Pedro M. Crespo, Bedminster, N.J.

[73] Assignee: Bell Communications Research, Inc., Livingston, N.J.

[21] Appl. No.: 392,772

[22] Filed: Aug. 11, 1989

[51] Int. Cl.$^5$ .......................... H04B 3/14; H03H 7/30
[52] U.S. Cl. ........................................ 375/12; 375/14; 375/101; 364/724.2; 333/18
[58] Field of Search .................... 375/12, 14, 101, 118; 364/724.16, 724.2; 333/18, 28 R; 381/103

[56] References Cited

U.S. PATENT DOCUMENTS

| | | | |
|---|---|---|---|
| 4,146,840 | 3/1979 | McRae et al. | 375/12 |
| 4,170,758 | 10/1979 | Tamburelli | 375/12 |
| 4,504,958 | 3/1985 | Tamburelli | 375/12 |
| 4,545,060 | 10/1985 | Arnon | 375/14 |
| 4,597,088 | 6/1986 | Posti et al. | 375/12 |
| 4,789,994 | 12/1988 | Randall et al. | 375/12 |

OTHER PUBLICATIONS

K. H. Mueller and M. Muller, "Timing Recovery in Digital Synchronous Data Receivers," *IEEE Transactions on Communications*, vol. COM-24, pp. 516-530, May 1976.

A. Jenning and B. R. Clarke, "Data-Sequence Selective Timing Recovery for PAM Systems," *IEEE Transactions on Communications*, vol. COM-33, pp. 729-731, Jul. 1985.

Simon Haykin, *Adaptive Filter Theory*, Prentice-Hall, New York, N.Y., 1986, pp. 216-217.

K. H. Muller and D. A. Spaulding, "Cyclic Equalization-A New Rapidly Converging Equalization Technique for Synchronous Data Communications," *Bell System Technical Journal*, vol. 54, pp. 369-406, Feb. 1975.

*Primary Examiner*—Benedict V. Safourek
*Assistant Examiner*—Ralph Smith
*Attorney, Agent, or Firm*—James W. Falk; Leonard Charles Suchyta

[57] ABSTRACT

A digital pulse receiver is disclosed in which the transmitted signal is recovered from the received signal by using a decision feedback equalizer to estimate and then remove the intersymbol interference. A second decision feedback equalizer is used to estimate the timing of the sampling pulse. An optimum timing phase is derived by driving the sampling clock with a phase adjustment signal optimizing the amplitude of the sampling pulse relative to the next preceding pre-cursor pulse. The signal recovery decision feedback equalizer and the timing recovery decision feedback equalizer share the same tapped delay line to provide a fully digital pulse receiver operating at the baud rate to provide an optimum sampling phase.

4 Claims, 3 Drawing Sheets

DECISION FEEDBACK EQUALIZER

TIMING RECOVERY

DECISION FEEDBACK EQUALIZER

RECEIVER ARCHITECTURE

TIMING RECOVERY CONTROL

BAUDRATE TIMING RECOVERY TECHNIQUE

TECHNICAL FIELD

This invention relates to digital signal transmission and, more particularly, to the recovery of pulse timing information after transmission over a noisy, narrow band channel such as a telephone subscriber loop.

BACKGROUND OF THE INVENTION

As digital data services proliferate, the need for data channels to carry these services into homes and businesses likewise increases. It has become common to install special wideband transmission facilities in those places where such wideband digital services are desired. These special transmission facilities are expensive, require continuous maintenance, often in the outside plant portion of the facility, and require expensive terminal equipment. It would be of considerable economic benefit if the twisted-pair telephone wires currently extending to virtually all of the homes and businesses in the country were able to carry such wideband digital services.

One of the most critical functions in a digital receiving system is symbol synchronization. In such a system, the received signal must be sampled at the baud rate in order to detect the transmitted pulse signal. Moreover, the choice of timing phase for operating the sampling device is crucial in minimizing errors due to noise and intersymbol interference. Choosing the correct sampling phase is even more critical in transmission systems using narrow band twisted-pair telephone lines to transmit the wideband digital signals necessary to support new services. In such systems, intersymbol interference is especially great and hence deriving a correct timing signal is especially difficult. The data signal in such a system is so distorted by intersymbol interference that normal methods of timing recovery operate marginally or not at all.

The prior art has typically used analog signal processing of the incoming data signal to derive a timing signal. Most digital receivers, however, rely on digital processing to recover the digital information modulated on the incoming pulse train. That is, the received signal is sampled at discrete time intervals and converted to digital amplitude magnitudes. All further processing is carried out using digital circuitry, typically realized with very large scale integration (VLSI). Since circuit cost and complexity increases with the sampling rate, it has become common to sample the incoming signal at the lowest possible rate, i.e., the baud rate. Unfortunately, baud rate sampling does not permit reconstruction of the analog signal waveform due to aliasing distortion and hence analog timing recovery cannot generally be used in digital receivers operating at the baud rate.

One prior art technique for overcoming this problem is taught by K. H. Mueller and M. Muller in an article entitled "Timing Recovery in Digital Synchronous Data Receivers," *IEEE Transactions on Communications*, Volume COM-20, May 1976, pages 516–530. In the Mueller et al. article, a preselected timing function is used to describe the optimal sampling instant. The coefficient values of this timing function are then estimated from the arriving signal samples. Since timing jitter depends on the actual pulse sequence transmitted as well as the impulse response, the timing function estimates have a relatively high variance. A similar type of timing recovery system is disclosed in "Data-Sequence Selective Timing Recovery for PAM Systems," by A. Jennings and B. R. Clarke, *IEEE Transactions on Communications*, Volume COM-33, July 1985, pages 729–731. Unfortunately, the Jennings et al. timing recovery system relies on a predetermined, but randomly occurring, pulse sequence for adjusting the timing phase. The problem of stably recovering timing information from an incoming digital signal sampled at the baud rate therefore remains.

SUMMARY OF THE INVENTION

In accordance with the illustrative embodiment of the present invention, timing information is recovered from an incoming digital by taking advantage of the same technology that is used to recover the signal values themselves. That is, digital circuitry is used to estimate the impulse response of the transmission channel and the intersymbol distortions resulting from this estimated impulse response are subtracted from the incoming signal to provide a reasonably good estimate of the transmitted digital pulse values. The error signal between the estimate of the transmitted signal and the received signal is used to adjust the impulse response estimator so as to minimize that error signal. The present invention generates another dynamically adaptable control signal which is used to optimize the phase of a sampling clock, using any desired optimizing function. In a preferred embodiment, the sampling phase is selected to maintain a preselected ratio between the pulse amplitude at the sampling time (the cursor amplitude) and the pulse amplitude the amplitude of the next preceding sampling time (the precursor amplitude).

In accordance with one feature of the present invention, the timing recovery technique herein disclosed and claimed can be readily coupled in a natural way with a signal receiver using a decision feedback equalizer (DFE).

In accordance with another feature of the present invention, the phase optimizing timing recovery capability of the present invention automatically adjusts for small deviations of the transmission pulse rate from the nominal pulse rate, and for small wanderings in the transmitted pulse rate due to changes in environmental conditions.

More specifically, phase optimal timing recovery is accomplished with an adaptive transversal filter driven by a decision-directed reference to cancel the sampled received far-end signal. The tap weight coefficients of the transversal filter are estimates of the impulse response of the transmission channel, adjusted to optimize the timing phase. In decision feedback equalizer receivers, the decision feedback transversal filter can share the tapped delay line of the timing recovery transversal filter, thereby significantly reducing the combined complexity and cost.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
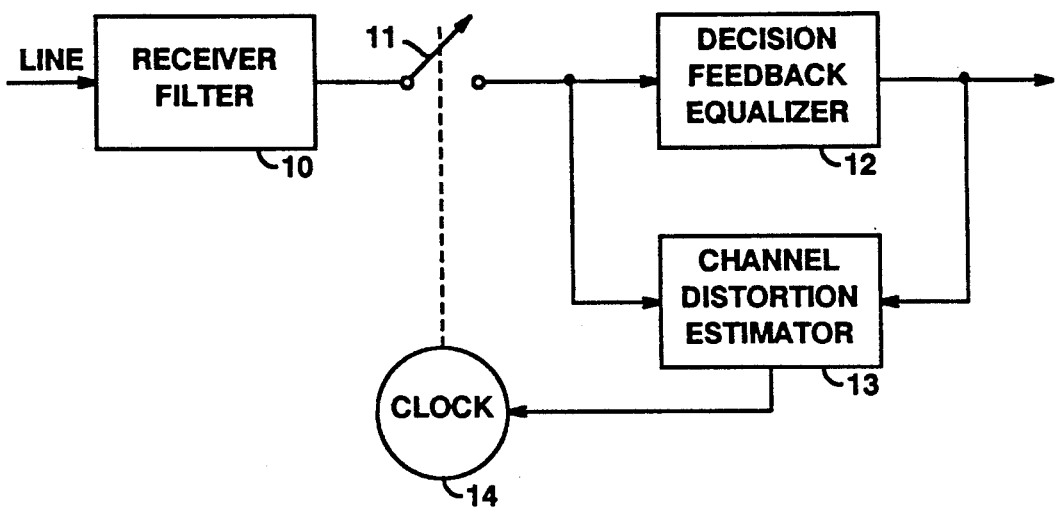
FIG. 1 shows a general block diagram of a digital receiver showing the general technique for timing recovery.

In FIG. 1 there is shown a general block diagram of a pulse receiver circuit in accordance with the present invention using a channel estimator circuit 13 to derive a clock control signal and a decision feedback equalizer 12 to remove intersymbol distortions from the received pulse train. The receiver of FIG. 1 thus comprises a receiver filter 10, a sampling switch 11 which generates regular samples of the input analog signal, and a decision feedback equalizer 12 designed to remove the intersymbol distortions introduced into the transmitted signal by the impulse response of the transmission channel. A clock 14, operating at the nominal pulse repetition rate of the transmitted pulse signal, operates sampling switch 11. The channel distortion estimator circuit 13, connected between the input and the output of decision feedback equalizer 12, generates a control signal, dependent on the actual distortions present in the transmission channel, which optimally adjusts the phase of the clock 14 to maximize the phase accuracy of the sampling switch 11.

Figure 2:
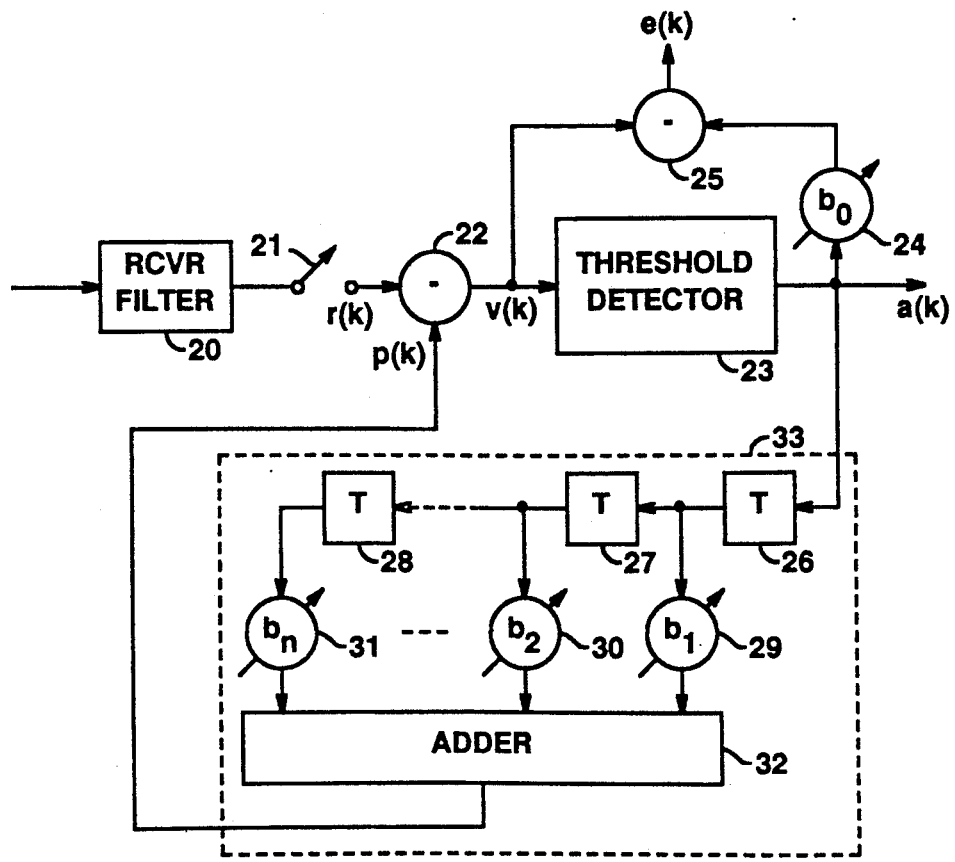
FIG. 2 shows a detailed circuit diagram of a decision feedback equalizer for the digital receiver of FIG. 1.

As an aid in understanding the present invention, a schematic diagram of a prior art pulse receiver using a decision feedback equalizer is shown in FIG. 2. The receiver of FIG. 2 comprises a fixed analog receiver filter 20 having a transfer function which insures that the slope of the leading edge of the impulse response is not reduced or is possibly even enhanced. The output of filter 20 is connected to sampling switch 21, operated at the baud rate, to supply samples to subtracter circuit 22. The output of subtracter circuit 22, in turn, is applied to threshold detector 23, the output of which comprises the estimated data symbols. A linear, all-zeroes transversal filter 33 is connected between the output of threshold detector 23 and subtracter 22. Transversal filter 33 comprises a tapped delay line including delay sections 26, 27, . . . , 28. Each of delay sections 26–28 delays the estimated symbols from threshold detector 23 by one baud. Tap multipliers 29, 30, . . . , 31 are connected to the respective taps on delay line 26–28. The values of the multiplication coefficients $b_1, b_2, \ldots, b_n$ for multipliers 29–31 are adjustable and, indeed, are adjusted dynamically such that transversal filter 33 provides an estimate of the post-cursor portion of the sampled impulse response of the transmission channel. The outputs of multipliers 29–31 are summed together in adder circuit 32 and the sum applied to subtracter circuit 22. If the transversal filter 33 exactly matches the post-cursor portion of the sampled channel impulse response, then it reproduces estimated the same intersymbol distortion between the output samples from detector 23 as are produced between the transmitted pulses by the impulse response of the transmission channel. These estimated distortion samples are subtracted from the received samples in subtracter 22 to provide the correct estimated symbols at the output of detector 23.

In order to drive the coefficient values of transversal filter 33 so as to eliminate distortions, an error signal is derived across threshold detector 23. This error signal adaptively adjusts the taps of the transversal filter 33 in accordance with some well-known adaptive algorithm such as the least square (LS) algorithm, the least mean square (LMS) algorithm or the recursive least square (RLS) algorithm. Although the LS and the RLS algorithms are faster than the LMS algorithm, they require more complex hardware to implement and hence the present invention will be described in terms of the LMS algorithm. It is to be understood, however, that any other adaptive algorithm can be used if warranted by the specific application. In accordance with the LMS algorithm, the input to detector 23 is applied to one input of subtracter 25 while the output of detector 23 is applied through adjustable multiplier 24 to the other input of subtracter 25. The error signal is the output of subtracter circuit 25. The LMS algorithm is shown in more detail in S. Haykin's test *Adaptive Filter Theory*, Prentice-Hall, New York, 1986, pages 216–217.

Figure 3:
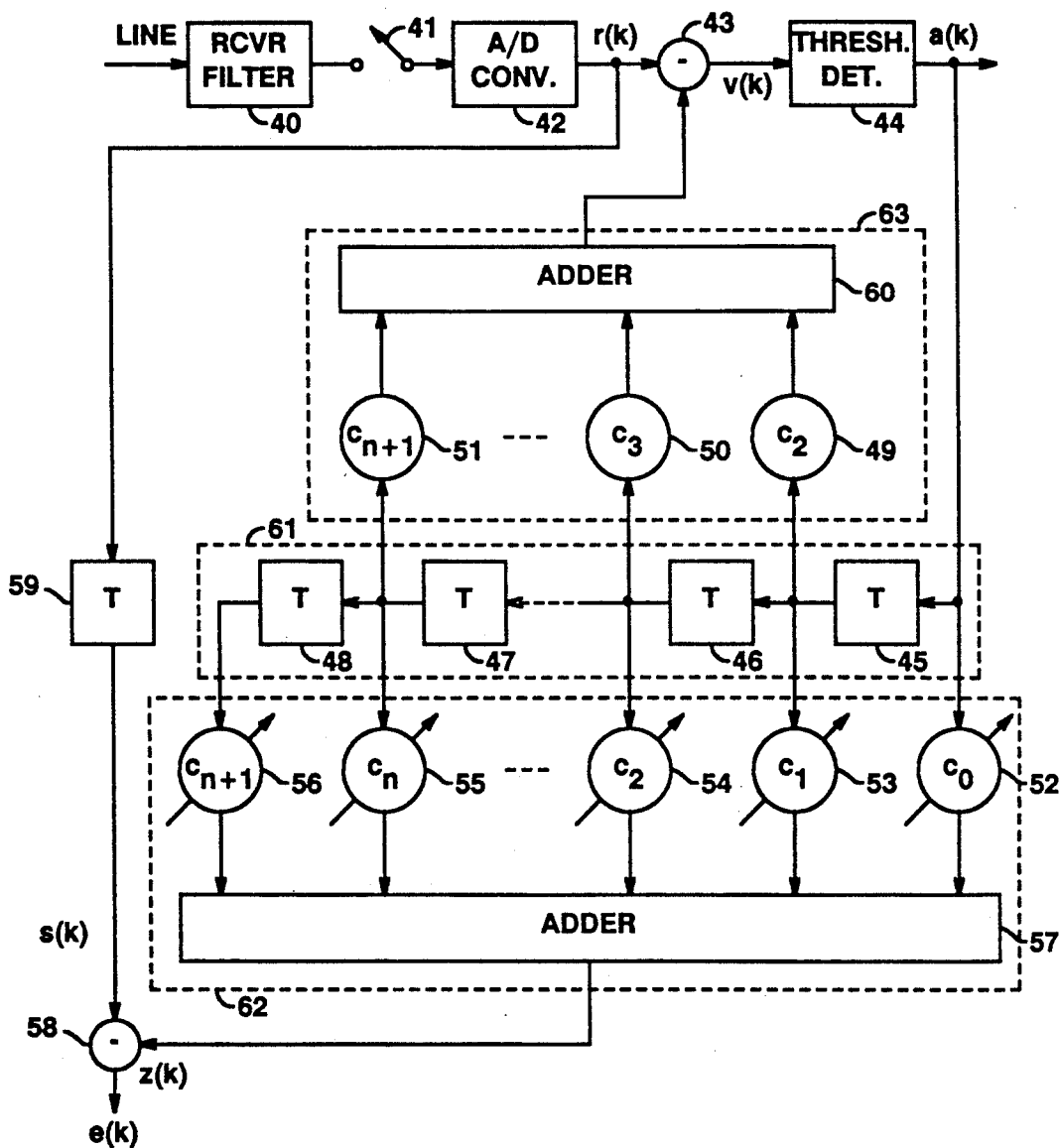
FIG. 3 shows a general block diagram of a sampling rate timing recovery arrangement in accordance with the present invention for use with the decision feedback equalizer of FIG. 2.

Before proceeding to a detailed description of the timing recovery circuit of FIG. 3, is is useful to derive an expression for the optimal timing phase for sampling the input to a decision feedback equalizer such as that shown in FIG. 2. The overall sampled impulse response of the system of FIG. 2, with a timing phase $\tau$, is given by $$h_{k-1} = h(kT + \tau)$$

$$k = 0, \ldots N+1$$

where $h_0$ represents the cursor, i.e., the maximum positive amplitude, of the impulse response, and hence the desired sampling time, $h_j (j = 1, \ldots, N)$ represents the post-cursors following the cursor, and where there is only one pre-cursor $h_{-1}$ where $(h_0 > h_{-1})$. Under the assumption that all symbol decisions in detector 23 have been correct, the received samples taken at times $(kT + \tau)$ by switch 21 and applied to subtracter 22 are given by $$r(k) = \sum_{n=-1}^{N} h_n a_{k-n} + n(t) * w(t)_{t=kT+\tau}$$

where w(t) is the impulse response of the receiver filter 20 and n(t) is additive Gaussian noise introduced in the transmission channel. The sample at the input to threshold detector 23, assuming correct previous decisions, can be written as $$v(k) = r(k) - p(k)$$

and hence $$v(k) = \sum_{n=-1}^{N} h_n a_{k-n} - \sum_{n=0}^{N} b(n+1) a_{k-n-1} + n(t) * w(t)_{t=kT+\tau} \quad (1)$$

In accordance with one well-known decision feedback filter design, the mean-square error (MSE) is chosen as the performance index for obtaining the coefficients of the feed-back filter 33 of FIG. 2. This mean-square error can be expressed as $$MSE = E[(v(k) - a_k b(0))^2] \quad (2)$$

where the E[ ] denotes expectation with respect to the added noise and to the independent and identically distributed data symbols ($a_i = -1, +1$). By substituting equation (1) into equation (2), and after a little manipulation, the expression for MSE becomes $$MSE = h_{-1}^2 + (h_0 - b(0))^2 + \sum_{i=1}^{N} (h_i - b(i))^2 + \sigma^2 \quad (3)$$

where $$\sigma^2 = \frac{N}{2} \int_{-\infty}^{+\infty} w^2(t) dt \quad (4)$$

From equation (3) it can be concluded that, given the timing phase $\tau$, the mean-square error MSE is minimized by setting $b(n) = h_n (n=0,1,\ldots,N)$. With this substitution $$MSE = h_{-1}^2 + \sigma^2$$

It can be seen that the minimum mean-square error MSE has two terms: one due to the additive noise and the other due to the uncanceled pre-cursor intersymbol interference (ISI).

For the particular timing phase $\tau$, the Bit Error Rate (BER) of this receiver can be expressed as $$BER(\tau) = Q\left(\frac{h_0 - h_{-1}}{\sigma}\right)$$

where the $Q(x)$ function is given by:

$$Q(x) = \frac{1}{\sqrt{2\pi}} \int_x^\infty e^{-\frac{t^2}{2}} dt$$

Ideally, the timing recovery circuit chooses a timing phase $\tau_{opt}$ that minimizes the BER. Minimizing BER is the same as maximizing $$\max_{-T/2 \leq \tau \leq T/2} [h_0 - h_{-1}]$$

Obviously, the optimal timing phase $\tau_{opt}$ will depend on the specific shape of the impulse response front-edge. A suboptimal, but close to optimal, criterion for choosing the sampling phase is:

Choose $\tau$ such that $\alpha h_{-1} - h_0 \approx 0$ ($\alpha >> 1$) (5)

The criterion of equation (5) will choose a timing phase that will make the pre-cursor $\alpha$ times smaller than the cursor. In FIG. 3, there is shown a receiver configuration which allows the estimation of the pre-cursor and cursor for the purpose of choosing an optimal timing phase.

FIG. 3 shows a more detailed circuit diagram of a combined decision feedback equalizer and timing recovery receiver in accordance with the present invention and shown in general block form in FIG. 1. The receiver of FIG. 3 comprises two decision feedback sections, one section for estimating the post-cursor impulse response in order to remove intersymbol interference, and another section for estimating the cursor and the pre-cursor samples in order to derive a timing recovery phase control signal. In FIG. 3, the output from the transmission channel is applied to receiver filter 40 the output of which is connected to sampling switch 41. The output of sampling switch 41 is connected to analog-to-digital converter 42 the output of which is connected to subtracter 43. The output of subtracter 43 is connected to threshold detector 44, the output of which comprises the received pulse train. The balance of the circuit of FIG. 3 comprises a compound, two-section feedback equalizer. One section of the equalizer comprises a decision feedback equalizer including tapped delay line 61 and multiplier-adder 63. The other section of the equalizer comprises a channel estimator, including tapped delay line 61 and multiplier-adder 62. Tapped delay line 61 includes a plurality of one-baud delay sections 45, 46, line sections 45-48 are connected to respective ones of multipliers 49, 50, ..., 51 of multiplier-adder 63 to form the decision feedback equalizer. The outputs of multipliers 49-51 are all connected to adder 60 the output of which is connected to subtracter circuit 43. The taps between delay line sections 45-48 are also connected to respective ones of multipliers 52, 53, 54, ..., 55, 56 of multiplier-adder 62 to form the channel estimator. The outputs of multipliers 52-56 are all connected to adder 57 the output of which is applied to subtracter circuit 58. The output of analog-to-digital converter 42 is delayed one pulse period in delay line section 59 and applied to the other input of subtracter 58. The output of subtracter 58 comprises an error signal which is used to adapt the coefficients $c_i$ of multiplier-adders 62 and 63. It should be noted that only one set of multiplers, those of multiplier-adder 62, are dynamically adapted. The multiplier coefficients of multiplier-adder 63 are merely copied from the the values calculated for multiplier-adder 62. This results is a significant reduction in the circuitry required for multiplier-adder 63.

As previously noted, the channel estimator comprised of delay line 61 and multiplier-adder 62 is also an adaptive transversal filter operating at the baudrate. The memory time of the transversal filter 61-62 should be at least as great as the time span of the entire impulse response h(t) of the channel. The transversal filter output from adder 57 is compared with the delayed channel output from delay section 59 and an error signal e(k) is obtained from subtracter 58.

In order to understand how the receiver of FIG. 3 operates, first assume that the remote transmitter sends a single pulse through a noiseless channel. Also, assume that there is a master oscillator driving sampling gate 41 and that the frequency of this master oscillator is stable enough to maintain the sampling rate constant during the duration of a few samples. This is not a real restriction with the present technological state of crystal oscillators. Assume also that the coefficients of the multipliers 49-51 and 52-56 of the transversal filters 61-63 and 61-62 are selected in such a way as to minimize the error signal e(k). Under these assumptions, the sample sequence at the output of the sampling switch 41 will be the sampled impulse response of the channel, i.e., $$\ldots 0\ 0h_{-1}h_0h_1 \ldots h_N 0\ 0 \ldots$$

Assuming that the sampling phase $\tau$ is such that $h_{-1} < -\mu < h_0$ where $\mu$ is the threshold of detector 44, then the output of detector 44, after the sample $h_{-1}$ arrives to its input, will be zero. In the next clock cycle, $h_0$ arrives, producing a "one" at the output of detector 44. Consequently, the value at the output of adder 57 at this time is given by the coefficient $c_0$ of the first multiplier 52. In order to make the error signal zero, the value of $c_0$ at this time must be equal to $h_{-1}$, the value of the pre-cursor pulse signal. In the next clock cycle, the detected "one" will be shifted, and if the coefficient of the first multiplier 49 of the decision feedback filter 61–63, $b_1$, is equal to the value of the first post-cursor, namely $h_1$, this post-cursor will be canceled in subtracter 43 before entering detector 44. Similarly, the coefficient $c_1$ of the second multiplier 53 of the channel estimator transversal filter 61–62 must take on the value $h_0$ to produce a zero error signal. By repeating these steps, it can be seen that, in order to obtain a zero error signal over the entire impulse response period, the coefficients of multipliers 52–56 must be equal to the impulse response samples. Similarly, in order to cancel the post-cursors, the coefficients of multipliers 49–51 must be equal to the amplitude values of the corresponding post-cursors.

During actual data transmission, of course, the above procedure is not available to obtain the weights of the filters since the actual sampled impulse response is not directly available. Instead, the multiplier coefficients are adaptively adjusted to minimize the mean-square error $E[e(k)^2]$ between the delayed impulse response $s(k)$ and the output $z(k)$ of the transversal filter 61–62. Assuming that there are no decision errors and that the data is uncorrelated, the mean-square error MSE of FIG. 3 can be written as $$e(k) = s(k) - z(k) = r(k-1) - z(k) =$$

$$\sum_{n=-1}^{N} h_n a_{k-n-1} - \sum_{n=0}^{N+1} c(n) a_{k-n} + n(t) * w(t)_{t=(k-1)T+\tau} =$$

$$\sum_{n=0}^{N+1} (h_{n-1} - c(n)) a_{k-n} + n(t) * w(t)_{t=(k-1)T+\tau}$$

where $c_n(n=0,1 \ldots N+1)$ are the coefficients of multipliers 52–56. Then $$MSE = E[e(k)^2] = \sum_{i=0}^{N+1} (h_{i-1} - c(i))^2 + \sigma^2$$

where $\sigma^2$ is given in equation (4). The MSE is minimized by choosing $c_n = h_{n-1}(n=0, \ldots N+1)$. Therefore, we obtain the same multiplier coefficients as before.

It is to be noted that the optimal multiplier coefficients $b_n$ of multipliers 49–51 are the same as the optimal multiplier coefficients $c_n$ of multipliers 52–56 for $n=2, \ldots N+1$. This considerable simplifies the construction of the receiver. Furthermore, the pre-cursor coefficient $c_0 = h_{-1}$ and the cursor coefficient $c_1 = h_0$ can be used to adjust the timing phase by using some timing function such as the one given in equation (5). The remaining multiplier coefficients $c_2 \ldots c_{N+1}$, can be copied for multipliers 49–51 in order to cancel the post-cursor samples in the decision feedback equalizer 61–63.

The above discussion has assumed that the receiver of FIG. 3 detects the transmitted symbols correctly before feeding them back into the transversal filters. Even though this is a correct assumption in the steady state, it does not apply during the transient at the beginning of transmission. To solve this problem, a training mode is typically used in which a known periodic training sequence is initially transmitted. Its period, in symbols, is typically equal to the number of taps on the transversal filter. This fast start-up method is described by K. H. Muller and D. A. Spaulding in "Cyclic Equalization-A New Rapidly Converging Equalization Technique for Synchronous Data Communications," *Bell System Technical Journal*, Volume 54, Feb. 1975, pages 369–406. Since this periodic training sequence can be made available at the receiver, and hence need not be deduced from the transmitted training sequence, rapid convergence of the taps of the transversal filter can be obtained. Synchronization between the stored periodic sequence and the received periodic signal is not necessary. However, due to this lack of synchronization, the multiplier coefficients that minimize the MSE for standard decision feedback equalizers might become cyclically displaced from their proper multiplier position, namely from the desired sampled impulse response: $h_{-1}h_0h_1 \ldots h_n$. Hence, at the end of the training sequence, it is necessary to identify the cursor by noting the input to adder 57 (FIG. 3) having the maximum amplitude. The multiplier coefficients of multipliers 52–56 are then all shifted, if necessary, so as to move the cursor coefficient to multiplier 52. At the same time, the sampling switch 41 is disabled for a corresponding number of input signal sample periods. The input data and the multiplier coefficients are thereby realigned in the proper phase and dynamic adaptation can continue, using the input signal rather than the training sequence. It can be shown that, in the training mode, the circuit of FIG. 3 always causes the multiplier coefficients to converge rapidly to the cyclic shifted sampled impulse response as the mean-square error tends toward zero for twisted-pair telephone transmission lines.

Figure 4:
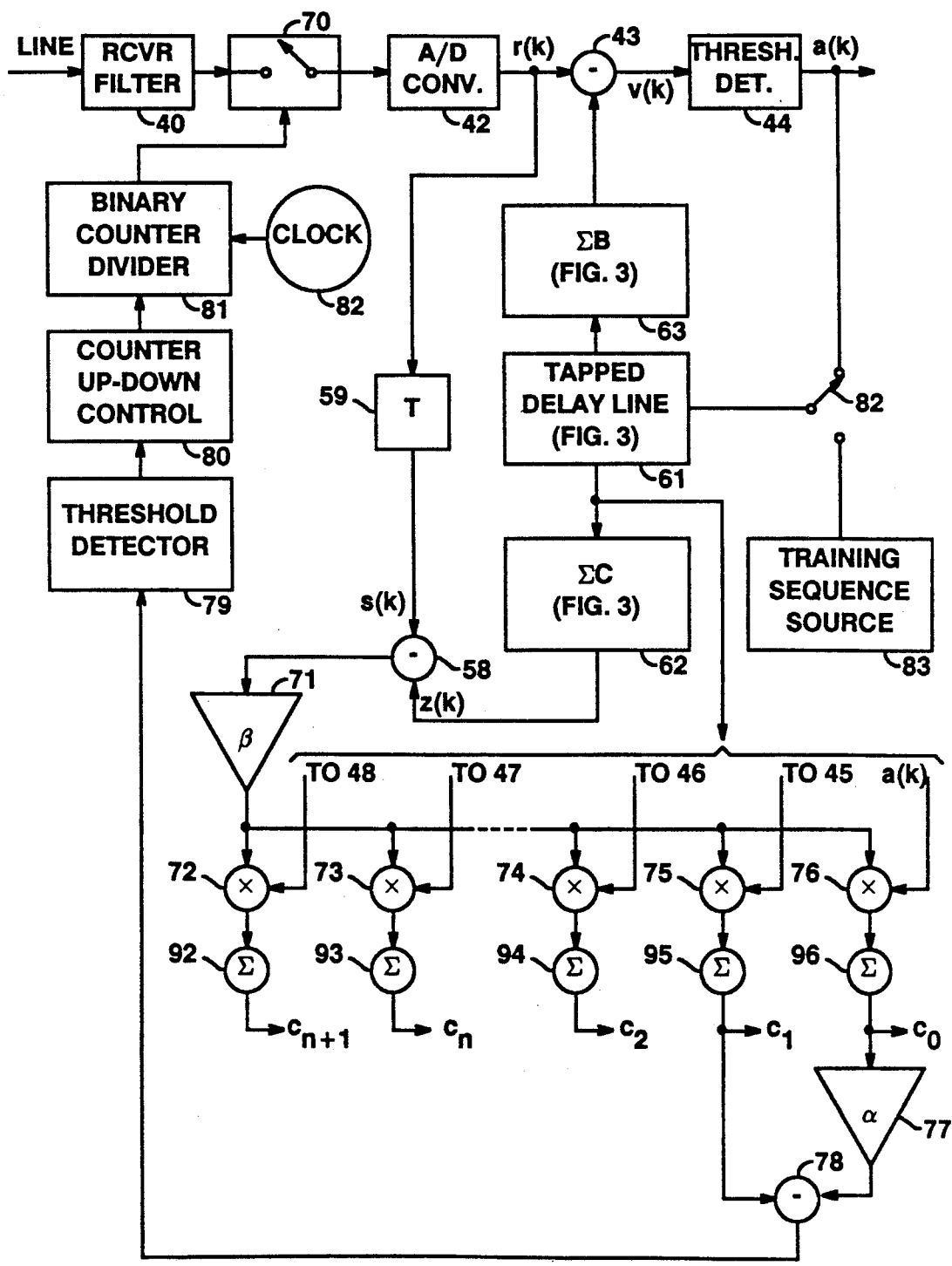
FIG. 4 shows a more detailed circuit diagram of the timing recovery circuits for the receiver of FIG. 3, showing the derivation of the optimum phase control signal.

Turning to FIG. 4, there is shown a detailed circuit diagram of the resulting receiver structure. The incoming signal is applied to receiver low pass filter 40 the output of which is applied through sampling switch 70 to analog-to-digital converter 42. The output of converter 42 is applied to one input of subtracter 43 the output of which is applied to threshold detector 44. The output of detector 44 comprises the output of the receiver.

The output of detector 44 is fed through selection switch 82 to tapped delay line 61, disclosed in detail in FIG. 3. The taps of delay line 61 are connected to multiplier-adder 63 (see FIG. 3) the output of which is applied to subtracter 43 to subtract out the intersymbol distortions in the received pulse train due to the post-cursor impulse response of the transmission channel.

The taps on delay line 61 are also connected to multiplier-adder 62 (see FIG. 3) the output of which is connected to one input of subtracter 58. The other input to subtracter 58 is the output of converter 42, delayed by one pulse period in delay line 59. The output of subtracter 58 is the error signal and is applied to multiplier 71 having a multiplying factor $\beta$. The value of $\beta$ is selected to insure convergence of the multiplier coefficients on the desired value during the training period. The value of $\beta$ is typically on the order of 0.01–0.03. The output from multiplier 71 is applied to the inputs of a plurality of multipliers 72, 73, . . . , 74, 75, 76. The other inputs to multipliers 72–76 comprise the signal values at the taps of delay line 61. The output of each of multipliers 72–76 is applied to the input of a respective one of accumulators 92–96. The outputs of accumulators 92–96 comprise the multiplier coefficients for the multipliers 52–56 as well as the coefficients for the multipliers 49–51.

As previously noted, the coefficient $c_0$ corresponds to the pre-cursor pulse while the coefficient $c_1$ corresponds to the cursor pulse. Using the strategy suggested in equation (5), the pre-cursor coefficient $c_0$ is multiplied by a constant $\alpha$ in multiplier 77 and compared to the cursor coefficient $c_1$ in subtracter 78. The difference is appled to threshold detector 79 to generate an indication that the $c_1$ is greater or less than $\alpha c_0$. Counter control circuit 80 uses the output of threshold detector 79 to control counter divider 81. Counter 81 is driven by master clock 82, to count down the pulses from clock 82 and apply every nth pulse to operate sampling gate 70. Clock 82 and counter 81 are selected to produce sampling pulses at the nominal pulse rate of the transmitted pulse train. Counter control 80, however, is able to alter the count in counter 81 by one count at a time, either up or down. By so adjusting the count in counter 81, the control circuit is able to adjust the phase of the sampling pulse. The fineness of this adjustment is determined by the maximum count of counter 81. The feedback circuit including multiplier 77, subtracter 78 and detector 80 causes the phase of the timing signal to be adjusted until the cursor signal is exactly $\alpha$ times the pre-cursor signal. The multiplication factor $\alpha$ can be any value desired, but is preferably on the order of 20.

A training sequence source 83 is available for initially setting up the coefficient values $c_i$ and $b_i$. The same training sequence is transmitted from the remote receiver while the input to tapped delay line 61 is connected, via switch 82, to training source 83. Training source 83 produces a known sequence of pulse signals at least equal in number to the number (n+2) of multipliers 52–56. As these pulses are received, the known pulse values (rather than the deduced pulse values) are used to adjust the multiplier coefficient values. At the end of the training period, the multiplier coefficients $c_0-c_{n+1}$ are shifted and the sampling switch 70 disabled as described in connection with FIG. 3. The input to delay line 61 is then switched to the output of detector 44 and the output of threshold detector 44 is applied to tapped delay line 61.

It will be noted that the circuit of FIG. 4 has the property of inherently compensating for small drifts in the repetition rate of the transmitted pulse stream, due, for example, to environmental changes. That is, the phase optimization taking place by means of counter control circuit 80 will, at the same time, and in the process of optimizing phase, track small changes in the pulse repetition rate.

It should be clear to those skilled in the art that further embodiments of the present invention may be made by those skilled in the art without departing from the teachings of the present invention.

What is claimed is:

1. A receiver for digital signals comprising
    a sampling gate, a subtracter and a threshold detector connected in series,
    a tapped delay line including a plurality of taps,
    means for applying the output of said threshold detector to the input of said tapped delay line,
    a respective first and a respective second multiplier connected to each tap of said delay line,
    means for accumulating the outputs of said first multipliers and applying the first accumulated output to said subtracter,
    means for accumulating the outputs of said second multipliers and applying the second accumulated output to control the phase of said sampling gate.

2. The receiver according to claim 1 further comprising
    means for delaying the output of said sampling gate,
    means for subtracting the delayed output of said sampling gate from said second accumulated output to form a difference,
    means for multiplying said difference by a fixed value less than one to form a quotient, and
    means for multiplying said quotient by the values at said taps to form multiplication coefficients for each respective one of said first and second multipliers.

3. The receiver according to claim 2 further comprising
    means for comparing the first and second coefficients of said multipliers to derive a phase control signal.

4. The receiver according to claim 3 further comprising
    a clock source operating at a frequency many times the repetition rate of said digital signals,
    a counter for dividing said clock frequency down to the nominal repetition rate of said digital signals, and
    a counter control circuit for adjusting the dividing value of said counter in response to said phase control signal.

* * * * *